(12) United States Patent
Williams et al.

(10) Patent No.: US 7,249,524 B2
(45) Date of Patent: Jul. 31, 2007

(54) FLUID FLOW RATE AND VOLUME SENSOR, AND FILTRATION APPARATUSES AND PURIFICATION APPARATUSES HAVING SUCH A SENSOR

(76) Inventors: Richard T. Williams, P.O. Box 39, Uwchland, PA (US) 19480; Carl Beiswenger, 112 Sweisford La., Pottstown, PA (US) 19465; Brian D'Archangelo, 723 Jacques Cir., Chester Springs, PA (US) 19425; Gene Toner, 1195 Doylestown Pike, Quakertown, PA (US) 18951

( * ) Notice: Subject to any disclaimer, the term of this patent is extended or adjusted under 35 U.S.C. 154(b) by 0 days.

(21) Appl. No.: 11/363,461

(22) Filed: Feb. 27, 2006

(65) Prior Publication Data

US 2006/0243059 A1  Nov. 2, 2006

(51) Int. Cl.
    *G01F 1/00* (2006.01)
(52) U.S. Cl. ....................................................... 73/861
(58) Field of Classification Search ..............................
    73/861.71–861.79; 210/87, 88, 100, 739
    See application file for complete search history.

(56) References Cited

U.S. PATENT DOCUMENTS

| | | | |
|---|---|---|---|
| 5,622,618 A | * | 4/1997 | Brane et al. .................. 210/88 |
| 5,876,610 A | * | 3/1999 | Clack et al. ................. 210/739 |
| 5,935,426 A | * | 8/1999 | Giordano et al. ............. 210/87 |
| 5,939,644 A | * | 8/1999 | Hsu ......................... 73/861.79 |
| 6,051,144 A | * | 4/2000 | Clack et al. ................. 210/739 |

\* cited by examiner

*Primary Examiner*—Harshad Patel
(74) *Attorney, Agent, or Firm*—John F. A. Earley, III; Frank J. Bonini, Jr.; Harding, Earley, Follmer & Frailey (57) ABSTRACT

A flow rate and volume sensor for determining the rate and volume of fluid flowing through an apparatus, such as an apparatus for filtering and/or conditioning and/or purifying fluid, such as water, and for indicating when a predetermined volume of fluid has flowed through the apparatus to, for example, signal when a cartridge filter housed in an apparatus for filtering and/or conditioning and/or purifying fluid should be replaced. In an apparatus for filtering and/or conditioning and/or purifying fluid, such as water, having a pressure vessel, an inlet port formed in the pressure vessel for introducing fluid to the pressure vessel, an outlet port formed in the pressure vessel for discharging fluid from the pressure vessel, and a chamber formed in the pressure vessel between the inlet and outlet ports for holding a cartridge filter, the fluid flow rate and volume sensor comprises an impeller mounted inside the pressure vessel for rotating in response to and at a rate in proportion to fluid flowing through the pressure vessel and past the impeller device, and a sensor device positioned outside the pressure vessel responsive to the impeller device for determining rate and volume of fluid flowing through the pressure vessel and for indicating when a cartridge filter housed in the apparatus for filtering and/or conditioning and/or purifying fluid is to be replaced based upon a determination by the sensor device that a predetermined volume of fluid has flowed through the pressure vessel.

6 Claims, 6 Drawing Sheets

FLUID FLOW RATE AND VOLUME SENSOR, AND FILTRATION APPARATUSES AND PURIFICATION APPARATUSES HAVING SUCH A SENSOR

BACKGROUND OF THE INVENTION

1. Field of the Invention

This invention relates to a flow rate and volume sensor for determining the rate and volume of fluid flowing through an apparatus, such as an apparatus for filtering and/or conditioning and/or purifying fluid, such as water, and for indicating when a predetermined volume of fluid has flowed through the apparatus to, for example, signal when a cartridge filter housed in an apparatus for filtering and/or conditioning and/or purifying fluid should be replaced.

2. Description of the Prior Art

Filtration apparatuses and purification apparatuses comprising pressure vessels that hold cartridge filters or the like for filtering and/or conditioning and/or purifying fluid (for example, water) are used in residential drinking water systems, boats, recreational vehicles, aircraft, and vending machines. The cartridge filter, or the like, used in the pressure vessel for filtering and/or conditioning and/or purifying fluid removes contaminants from the fluid as the fluid flows through the cartridge filter, or the like, thereby filtering and/or conditioning and/or purifying the fluid. The cartridge filter, or the like, has a specific lifespan for filtering and/or conditioning and/or purifying fluid, and at the end of the lifespan, the cartridge filter, or the like, should be replaced with a fresh cartridge filter, or the like, in order to continue to effectively remove contaminants from the fluid flowing through the pressure vessel. Failure to replace a cartridge filter, or the like, after the cartridge filter, or the like, has been spent may possibly lead to contaminants not being removed from the fluid by the spent cartridge filter or the like, which may lead to hazardous situations. For example, when the fluid is water, contaminants may remain in the water after passing through the spent cartridge filter, or the like, and when such water having unremoved contaminants therein is consumed, health hazards may occur.

With some filtration apparatuses and purification apparatuses, after a certain amount of fluid has been filtered and/or conditioned and/or purified, the cartridge filter or the like becomes clogged with contaminants and therefore spent. A reduction in or slowing down of the normal flow rate of filtered/conditioned/purified fluid from the filtration apparatus or the purification apparatus indicates that the cartridge filter or the like has become clogged With contaminants and needs to be replaced.

Various attempts have been made to provide an indication for when a cartridge filter or the like should be replaced with a fresh cartridge filter or the like in place of merely waiting for the cartridge filter or the like to become clogged and the flow rate therethrough reduced to an unacceptable rate. For example, a known water filtration apparatus has a flow indicator that senses water flow and indicates that water flow is taking place.

Another known water filtration apparatus senses water flow and assumes a flow rate to calculate an estimated total flow of water through the water purifier. This known water filtration apparatus is complicated and only produces an estimated total flow, which leads to the cartridge filter being replaced prematurely if the actual flow rate used is typically lower than the assumed flow rate and to the cartridge filter being replaced well past the recommended life of the cartridge filter if the actual flow rate is typically higher than the assumed flow rate.

Another known water filtration apparatus uses a timer to determine when it is time to replace the cartridge filter. Because replacement of the cartridge filter is determined by time rather than by usage of the water filtration apparatus, replacement of the cartridge filter may be called for prematurely when the water filtration apparatus is not regularly used or replacement of the cartridge filter may be called for well beyond the recommended life of the cartridge filter when the water filtration apparatus is used a lot.

However, it would be desirable to provide a flow sensor that indicates when a cartridge filter or the like should be replaced based on the actual amount of fluid flow that the cartridge filter or the like has been designed to filter and/or condition and/or purify, rather than a possibly inaccurate estimated amount of fluid flow.

SUMMARY OF THE INVENTION

It is an object of the invention to provide a fluid flow rate and volume sensor for an apparatus for filtering and/or conditioning and/or purifying a fluid, such as water, that indicates when a cartridge filter or the like housed in the apparatus should be replaced based on the actual amount of fluid that has flowed through the cartridge filter or the like of the apparatus.

It is another object of the invention to provide an apparatus for filtering and/or conditioning and/of purifying a fluid, such as water, having a fluid flow rate and volume sensor that indicates when a cartridge filter or the like used in the apparatus should be replaced based on the actual amount of fluid that has flowed through the cartridge filter or the like of the apparatus.

These and other objects are accomplished by our invention, which is set out below.

DETAILED DESCRIPTION

Figure 1:
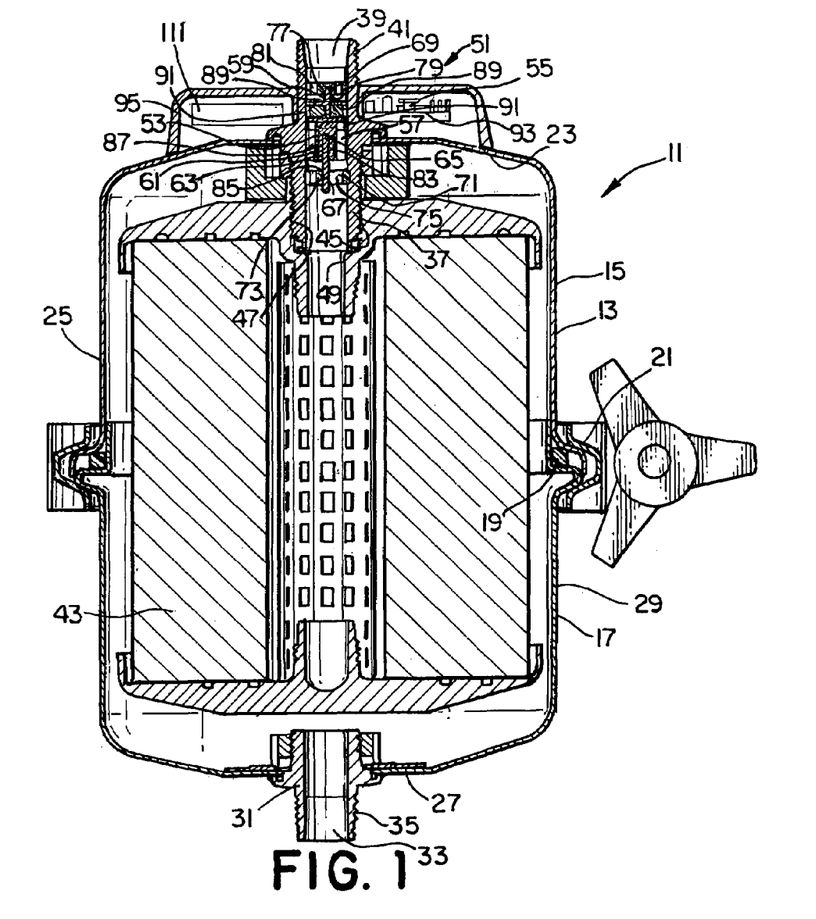
FIG. 1 is a view in cross-section of an apparatus for filtering and/or conditioning and/or purifying a fluid, constructed in accordance with the invention.

Turning to the drawings, and in particular to FIG. 1, there is shown an apparatus 11 for filtering and/or conditioning and/or purifying a fluid, such as water. The apparatus 11 comprises a pressure vessel 13 that includes a cover 15, a bowl 17 positioned below the cover 15, a seal 19 between the cover 15 and the bowl 17 for sealing between the cover 15 and the bowl 17, and a securing member 21 for securing the cover 15 to the bowl 17.

Cover 15 has a top wall 23 and a side wall 25 extending downwardly from the top wall 23. Bowl 17 has a bottom wall 27 and a side wall 29 extending upwardly from the bottom wall 27.

The securing member 21 may be a clamp, such as a V-clamp, or an adhesive, or a welded joint, or a threaded or interlocking joint, or a track and flexible shear rod securing device such as that disclosed in U.S. Pat. No. 5,230,810 which is incorporated herein by reference, or any other conventional securing member.

An inlet port 31 for introducing fluid to the pressure vessel 13 is formed in and extends through the bottom wall 27 of the bowl 17, and defines an inlet channel 33. The inlet port 31 shown in the drawings is provided with external threading 35 which receives internal threading of a fitting of a hose or pipe from which the fluid to be introduced into the pressure vessel 13 comes. However, any conventional connection means may be substituted.

An outlet port 37 for discharging fluid from the pressure vessel 13, after the fluid has been filtered and/or conditioned and/or purified, is formed in and extends through the top wall 23 of the cover 15, and defines an outlet channel 39. The outlet port 37 shown in the drawings is provided with external threading 41 which receives internal threading of a fitting of a hose or pipe into which the fluid leaving the pressure vessel 13 goes. However, any conventional connection means may be substituted. Alternatively, the pressure vessel 13 may discharge directly, without connection to a conveyance means.

A pressure gradient member 43 is provided inside the pressure vessel 13 for filtering and/or conditioning and/or purifying the fluid, and the pressure gradient member 43 is positioned inside the pressure vessel 13 such that fluid entering the pressure vessel 13 passes through the pressure gradient member 43 prior to exiting the pressure vessel 13 through the outlet port 37. The pressure gradient member 43 shown in the drawings is mounted onto the outlet port 37 by screwing the pressure gradient member 43 onto external threading 45 which receives internal threading 47 formed in the outlet port 49 of the pressure gradient member 43. The pressure gradient member 43 may be a cartridge filter, as illustrated in the drawings, loose media, and the like.

A fluid flow rate and volume sensor 51 is provided for determining flow rate and volume of fluid flowing through apparatus 11 and indicating when the pressure gradient member 43, such as the cartridge filter shown in the drawings, should be replaced. The fluid flow rate and volume sensor 51 comprises an impeller device 53 that is mountable inside the pressure vessel 13 for rotating in response to fluid flowing past the impeller device 53, and a sensor device 55 that is responsive to the impeller device 53 for determining flow rate and volume of fluid flowing through the pressure vessel 13 and for indicating when the pressure gradient member 43, such as the cartridge filter shown in the drawings, should be replaced, based upon a determination by the sensor device 55 that a predetermined volume of fluid has flowed past the impeller device 53.

The impeller device 53 includes a body 57 having a first end portion 59, a second end portion 61, and a central longitudinal axis extending between the first end portion 59 and the second end portion 61. A first bore 63 is formed in the body 57 and extends along the central longitudinal axis and has an open end at the second end portion 61 of the body 57. A first shaft 65, preferably stainless steel, is fixedly mounted within the first bore 63 and has a first end portion 67 that extends from the open end of the first bore 63 at the second end portion 61 of the body 57 in line with the central longitudinal axis of the body 57.

A second shaft 69 is formed on the first end portion 59 of the body 57 and extends upwardly away from the body 57 along the central longitudinal axis.

Preferably, the body 57 and second shaft 69 are an integral structure formed from a long-wearing non-abrasive plastic, preferably made from Celcon material.

A first mounting member 71, preferably made of plastic, is mounted in the outlet channel 39 of the outlet port 37 of the pressure vessel 13, and the first mounting member 71 has a central bore 73 for receiving the first shaft 65. The first mounting member 71 also has openings 75 formed therein for permitting fluid to pass therethrough. Preferably, the first mounting member 71 takes the form of a trivet or has a pinwheel structure.

A second mounting member 77, preferably made of plastic, is also mounted in the outlet channel 39 of the outlet port 37 of the pressure vessel 13, and the second mounting member 77 has a central bore 79 for receiving the second shaft 69. The second mounting member 77 has openings 81 for permitting fluid to pass therethrough. Preferably, the second mounting member 77 takes the form of a trivet or has a pinwheel structure.

As shown in FIG. 1, the impeller device 53 has a cylindrically-shaped impeller 83 having a longitudinally central bore 85 extending therethrough which receives a portion of the body 57 in a press-fit engagement to hold the impeller 83 fixedly to the body 57. The impeller 83 is provided with vanes 87 that cause the impeller device 53 to rotate as fluid flows past the impeller device 53. Preferably, the impeller 83 is made of plastic.

The impeller device 53 has a pair of magnet holding chambers 89 formed in the body 57 on opposite sides of the central longitudinal axis of the impeller device 53, into each a magnet 91 is placed. Rotation of the impeller device 53 causes the magnets 91 to rotate around the central longitudinal axis of the impeller device 53.

Figure 8:
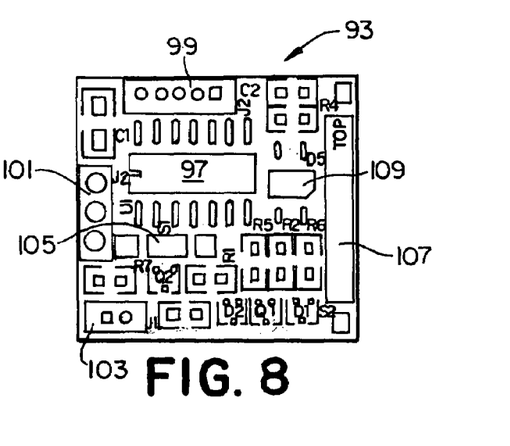
FIG. 8 shows a view in top plan of the sensor device of the invention.

The sensor device 55 includes an electrical circuit 93 located within a housing 95 mounted to the pressure vessel 13 outside the pressure vessel 13. The electrical circuit 93, as shown in FIG. 8, includes a programmable industrial computer 97, a programming connector 99, three jumper pins 101, a battery connector 103, a push-button switch 105, a reed switch 107, a two-color LED 109 responsive to the industrial computer 97 for indicating when it is time to replace the pressure gradient member 43 for filtering and/or conditioning and/or purifying fluid passing therethrough, and for indicating when fluid is flowing through the pressure vessel 13, and for indicating when it is close to time for replacing the pressure gradient member 43 for filtering and/or conditioning and/or purifying fluid passing therethrough, capacitors (marked with the letter "C"), transistors, (marked with the letter "Q"), diodes (marked with the letter "D"), and resistors (marked with the letter "R") which are linked together to provide the functions set out below. As shown in FIG. 1, a battery 111 is provided, which is connected to the battery connector 103, to supply power to the various components of the sensor device 55.

In operation, the fluid to be filtered and/or conditioned and/or purified may be introduced into the pressure vessel 13 through the inlet port 31, passed through the pressure gradient member 43 to filter and/or condition and/or purify the fluid, and then discharged from the pressure vessel 13 through the outlet port 37. As the fluid moves along the outlet channel 39 of the outlet port 37, the fluid pushes against the vanes 87 of the impeller device 53 to cause the impeller device 53 to rotate. As the impeller device 53 rotates, the magnets 91 positioned in the magnet holding chambers 89 rotate around the central longitudinal axis of the body 57 of the impeller device 53. Each time the longitudinal axis of the magnets 91, which are aligned with one another in this embodiment of the invention, is parallel to the reed switch 107 of the electrical circuit 93 of the sensor device 55 as the magnets 91 rotate with the impeller device 53 in the outlet channel 39, the electrical circuit 93 closes in response to engagement with the magnetic flux of the magnets 91. Specifically, in the embodiment of the invention described herein, each time the magnetic flux of the magnets 91 engages the reed switch 107, the reed switch 107 is triggered to close the electrical circuit 93 and send a signal to the computer 97 to record a count of one-half turn of the impeller device 53. When the magnetic flux of the magnets 91 is not in engagement with the reed switch 107 (e.g., rotates out of parallel alignment), the reed switch 107 opens the electrical circuit 93 until the magnetic flux of the magnets 91 rotates into alignment again with the electrical circuit 93 to trigger the reed switch 107 again causing the electrical circuit 93 to close again signaling to the computer 97 to add another count of one-half turn of the impeller device 53.

Fluid may continue to flow through the apparatus 11 to filter and/or condition and/or purify the fluid until the count of half turns of the impeller device 53 reaches a predetermined number of counts corresponding to a predetermined volume of fluid that has flowed past the impeller device 53 and therefore through the pressure gradient member 43. Preferably, when a first predetermined count of half turns of the impeller device 53 is reached, the LED 109, in response to the computer 97 and the computer program contained therein, begins to flash orange indicating that it soon will be time to refresh the apparatus 11 by replacing the pressure gradient member 43 for filtering and/or conditioning and/or purifying the fluid. When a second predetermined count of half turns of the impeller device 53 is reached, the LED 109, in response to a signal from the computer 97, changes to red to indicate that it is time to replace the pressure gradient member 43 for filtering and/or conditioning and/or purifying the fluid. At this time the pressure gradient member 43 may be replaced, and the sensor device 55 reset to zero to place the apparatus 11 ready again for filtering and/or conditioning and/or purifying a fluid.

Since the rate of rotation of the impeller device 53 is directly proportional to the flow rate of fluid that has flowed past the impeller device 53, and since the number of rotations of the impeller device 53 is directly proportional to the total volume of fluid that has flowed past the impeller device 53, the total volume of fluid that has flowed past the impeller device 53, which matches the total amount of fluid that has flowed through the pressure gradient member 43, may be determined by the computer 97 using the programming inputted therein (which includes relevant dimensions of the outlet port 37 and the impeller device 53) by calculating how fast the impeller device 53 rotates and the total number of rotations of the impeller device 53 caused by fluid flowing past the impeller device 53. The computer 97 is programmed to count the number of times the electrical circuit 93 closes and the frequency that it closes, and each time the electrical circuit 93 closes in response to rotation of the impeller device 53 is referred to as a count. In the embodiments of the invention shown in the drawings, a fall rotation of the impeller device 53, 53' closes the electrical circuit 93 twice, creating two counts recognized by the computer 97. The computer 97, by counting the number of counts (that is the number of times the electrical circuit 93 closes in response to rotation of the impeller device 53) and the rate that the counts occur, may determine the number of rotations of the impeller device 53, the flow rate of fluid flowing past the impeller device 53 and the total amount of volume of fluid that has flowed by the impeller device 53. Further, the computer 97 may send a signal to the LED 109 to flash particular colors indicating where in the life cycle of the pressure gradient member 43 the pressure gradient member 43 is based on how much fluid has flowed past the impeller device 53.

If desired, additional magnets 91 may be provided. If additional magnets 91 are provided on the impeller device 53 which are not parallel to the longitudinal axis of the magnets 91 described above, one rotation of the impeller device 53 would result in creating additional counts per revolution of the impeller device 53, and the programming in the computer 97 would have to be adjusted to register the change in the number of counts per revolution of the impeller device 53, and to recognize the increase in total number of counts per revolution of the impeller device 53, before it is time for the computer 97 to signal the end of life of the pressure gradient member 43.

Referring to FIG. 8, the computer 97 may be programmed such that, in response to the push-button switch 105 being briefly pushed and released, the computer 97 causes the LED 109 to show via a flash sequence which of the three programs stored in the computer 97 has been factory selected for use and that the intended portion of the computer program has been accessed. In the embodiment of the invention described herein, the computer 97 is provided with three programs that calculate flow rate of fluid flowing past the impeller device 53 and the total volume of fluid that has flowed past the impeller device 53 (and therefore through the pressure gradient member 43 as well) to cover three different capacity handling pressure gradient members 43, each designed to filter and/or condition and/or purify a different capacity (e.g., 1,000 gallons, 1,500 gallons, and 2,000 gallons) of fluid volume flowing therethrough. The selection of which of the three computer programs is to be used for a particular apparatus 11 is made at the factory during manufacturing of the particular apparatus 11 by positioning a jumper on the appropriate jumper pin 101. The program selected for use is indicated by the LED 109, and, for instance, when the push-button switch 105 is briefly pushed and released, an indication is sent by the computer 97 to the LED 109 which reflects which portion of the program has been accessed. For example, the computer 97 may send a signal to the LED 109 causing it to flash red for the 1,000 gallon program, to flash orange for the 1,500 gallon program, and green for the 2,000 gallon program.

Although the computer 97 is provided with three programs in the preferred embodiment of the invention described herein, virtually any number of programs may be installed and used, and, if necessary, additional memory and/or additional jumper or other switching may be added.

Figure 9:
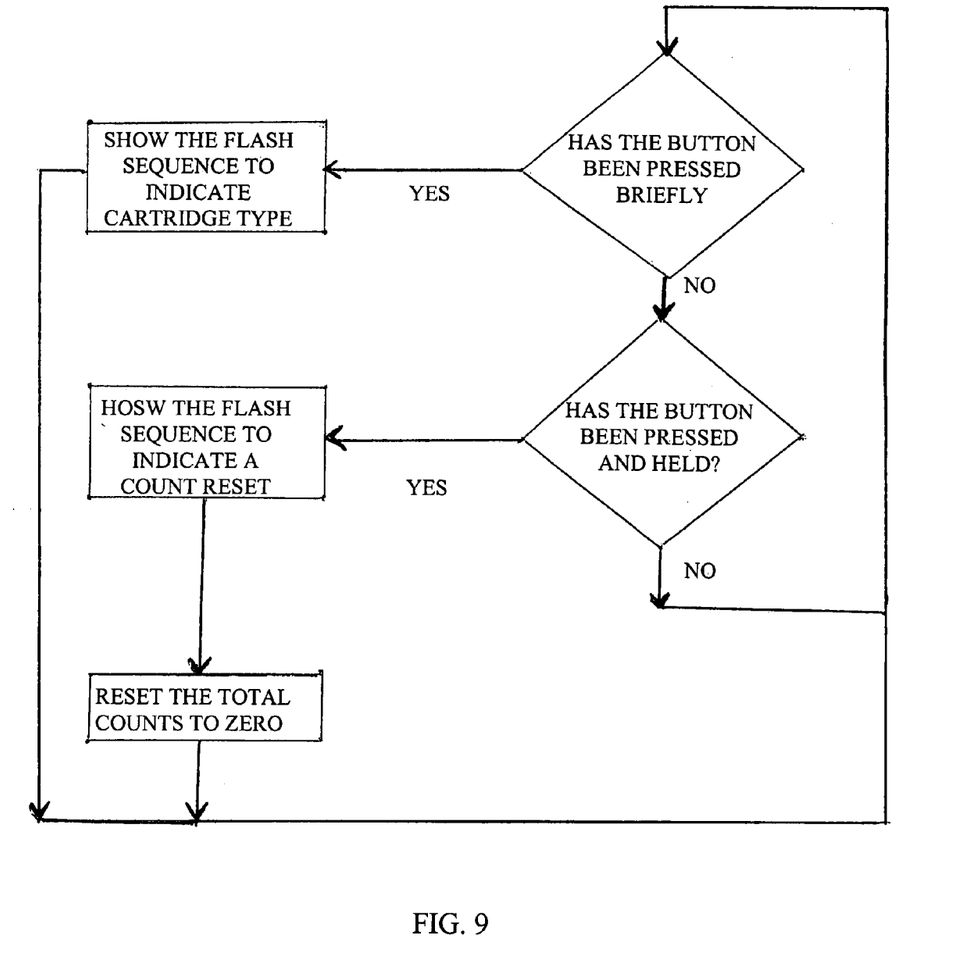
FIG. 9 shows a flow chart of the steps taken to see (by light sequence) which program is active in the computer of the sensor device of the inventive fluid flow rate and volume sensor.
Figure 10:
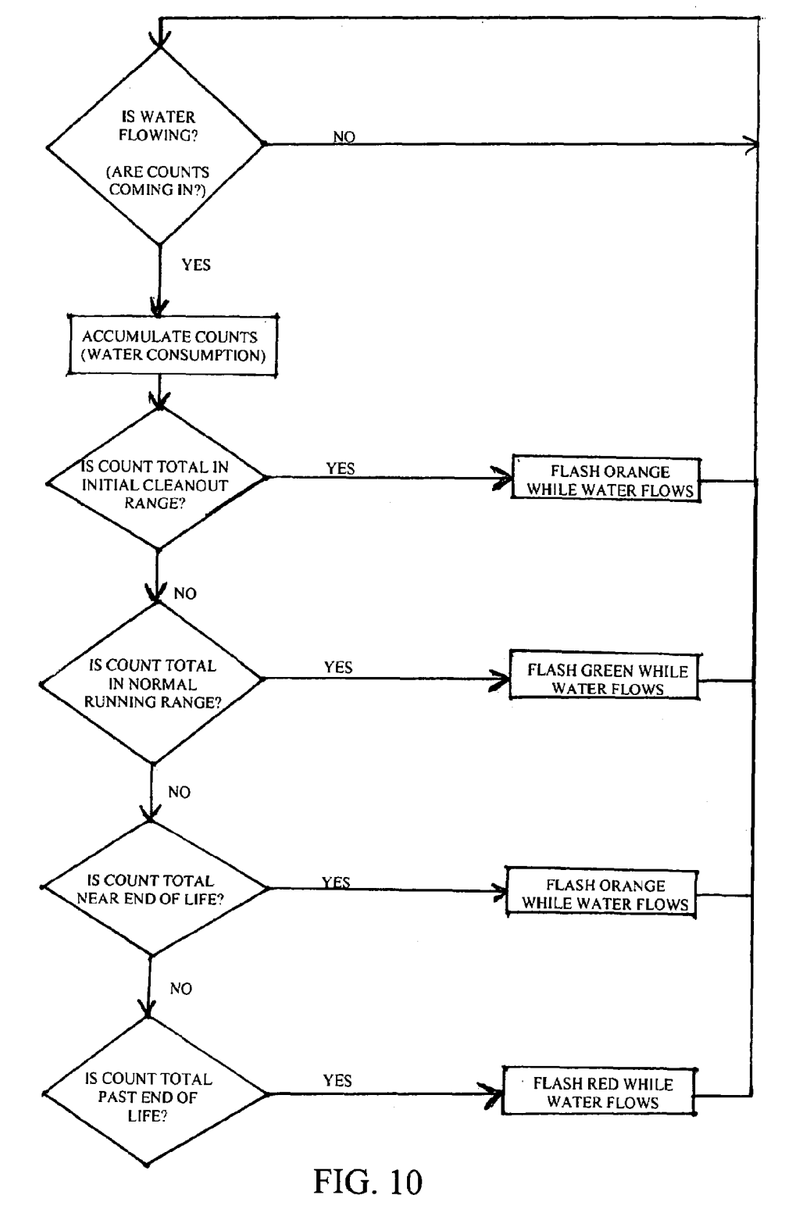
FIG. 10 is a flow chart illustrating the steps taken by the sensor device of the invention during operation of the apparatus of the invention.

Referring to FIGS. 9 and 10, nor to beginning operation of apparatus 11 by flowing fluid through the pressure vessel 13 to filter and/or condition and/or purify the fluid, the fluid flow rate and volume sensor 51 is reset when a spent pressure gradient member 43 is replaced with a fresh pressure gradient member 43. The push-button switch 105 may be pressed and held to send a signal to the computer 97 to show a predetermined flash sequence on the LED 109 to indicate resetting of the count of half rotations of the impeller device 53 to zero and to reset the total counts of half rotations of the impeller device 53 to zero.

Referring to FIG. 10, the computer 97 is preferably programmed to cause the LED 109 to flash orange when the initial flow of fluid occurs until the count total reaches a predetermined total indicating that cleaning out or wash through of the apparatus 11 has occurred, and at this point, the computer 97 causes the LED 109 to begin to flash green indicating normal running of fluid flow through the apparatus 11.

Preferably, the computer 97 is programmed such that the LED 109, in response to the computer 97, flashes green while flow of fluid through the pressure vessel 13 occurs at normal operating conditions, with the LED 109 flashing slowly for slow flow rates of fluid through the outlet channel 39 of the outlet port 37 and more quickly as the fluid flow rate increases. Likewise, preferably the computer 97 is programmed such that the LED 109, in response to the computer 97, flashes orange while flow of fluid through the pressure vessel occurs when it is close to time to replace the pressure gradient member 43, with the LED 109 flashing slowly for slow flow rates of fluid through the outlet channel 39 of the outlet port 37 and more quickly as the fluid flow rate increases.

Figure 2:
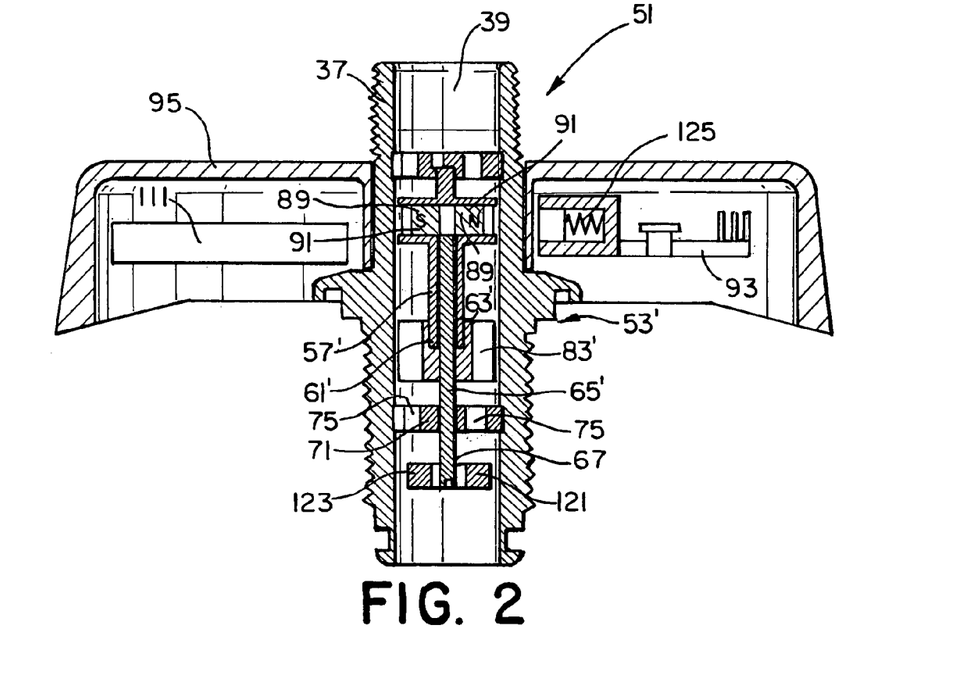
FIG. 2 is a partial view in cross-section of an alternative embodiment of the invention, in which the fluid flow rate and volume sensor of the invention includes a shut-off stopper for restricting or stopping flow of fluid through the inventive apparatus when it is time to replace a filtration cartridge or the like, the shut-off stopper being shown in an unengaged condition.
Figure 3:
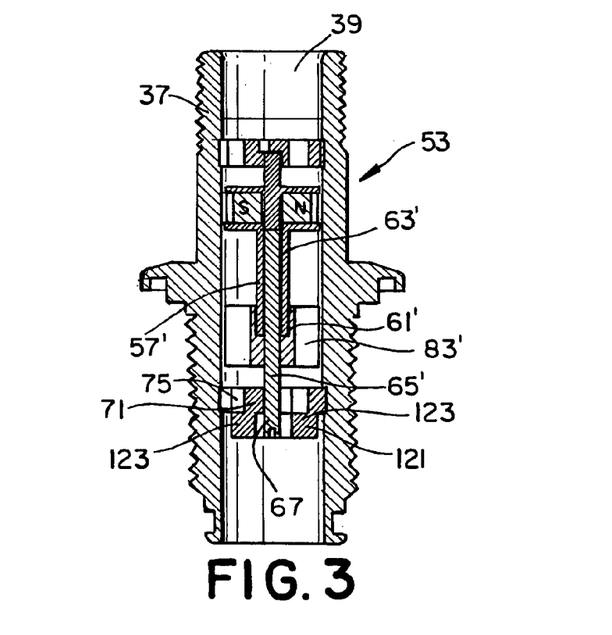
FIG. 3 is a view in cross-section showing the shut-off stopper of FIG. 2 in an engaged condition blocking fluid or restricting the flow of fluid through the outlet port of the pressure vessel of the inventive apparatus.

Turning now to FIGS. 2 and 3, there is shown an alternative embodiment of the invention. In this embodiment of the invention, the fluid flow rate and volume sensor 51 includes a shut-off stopper 121 that is responsive to the sensor device 55 for restricting or stopping flow of fluid through the pressure vessel 13 when it is time to replace the pressure gradient member 43 for filtering and/or conditioning and/or purifying fluid passing therethrough. The shut-off stopper 121 in this alternative embodiment of the invention is mounted on the first end portion 67 of the first shaft 65 and has portions 123 that are aligned with the openings 75 in the first mounting member 71 such that when the shut-off stopper 121 engages the first mounting member 71 the openings 75 in the first mounting member 71 are at least substantially blocked to restrict or block flow of fluid through the openings 75 in the first mounting member 71.

The first shaft 65, onto which the shut-off stopper 121 is mounted, is slideably keyed in the first bore 63 of the body 57 of the impeller device 53.

As shown in FIG. 2, one of the magnet holding chambers 89 intersects the first bore 63 such that during normal operational fluid flow conditions the magnet 91 located in that magnet holding chamber 89 is positioned where the first bore 63 and the magnet holding chamber 89 intersect to block movement of the shut-off stopper 121 toward the first mounting member 71 by blocking movement of the first shaft 65 inwardly into the first bore 63 of the body 57 of the impeller device 53'.

When it is time to replace the pressure gradient member 43, the magnet 91 positioned at the intersection of the first bore 63 and the magnet holding chamber 89 is repositioned in the magnet holding chamber 89 away from the first bore 63 to permit the first shaft 65 having the shut-off stopper 121 mounted thereon to move inwardly into the first bore 63 until the shut-off stopper 121 engages the first mounting member 71 to restrict or block flow of fluid through the openings 75 in the first mounting member 71.

An actuator 125, preferably a solenoid device, is mounted in housing 95 and aligned with the magnet 91, and in response to a signal from the computer 97, positions the magnet 91 in the magnet holding chamber 89 where the magnet holding chamber 89 intersects the first bore 63 when apparatus 11 is operated under normal fluid flow conditions, and in a position in the magnet holding chamber 89 away from the first bore 63 when it is time to replace the pressure gradient member 43.

In this embodiment, the impeller device 53' is substantially the same as the impeller device 53, except that shaft 65' of the body 57' is longer than the shaft 65 of the body 57 and has a constant diameter between the magnet holding chambers 89 and second end portion 61' of the body 57. Also, the impeller 83' used in place of the impeller 83 is fixedly mounted on the second end portion 61' of the body 57'.

Figure 4:
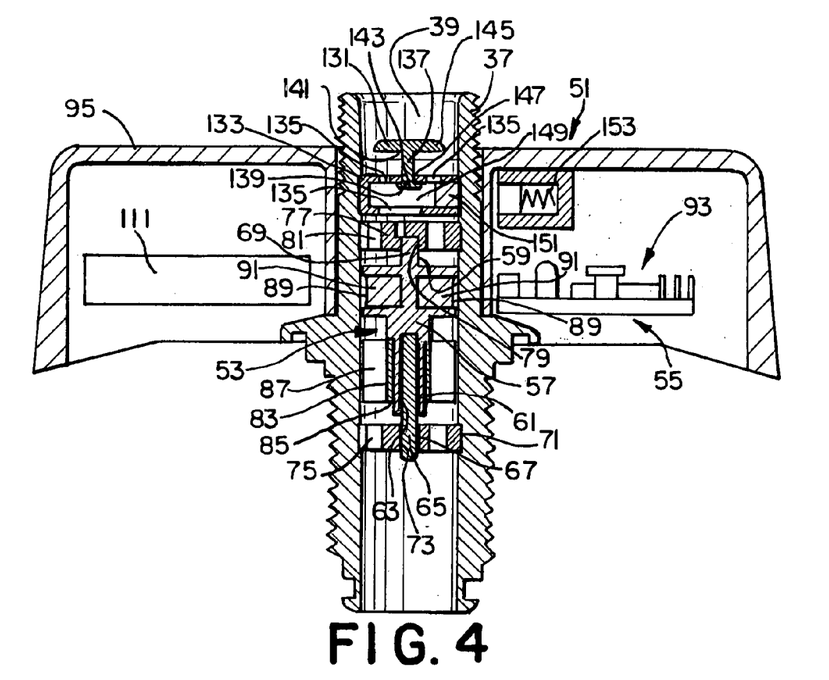
FIG. 4 is a partial view in cross-section of another alternative embodiment of the invention, in which the fluid flow rate and volume sensor of the invention includes a shut-off stopper for restricting or stopping flow of fluid through the inventive apparatus when it is time to replace a filtration cartridge or the like, the shut-off stopper being shown in an unengaged condition.
Figure 5:
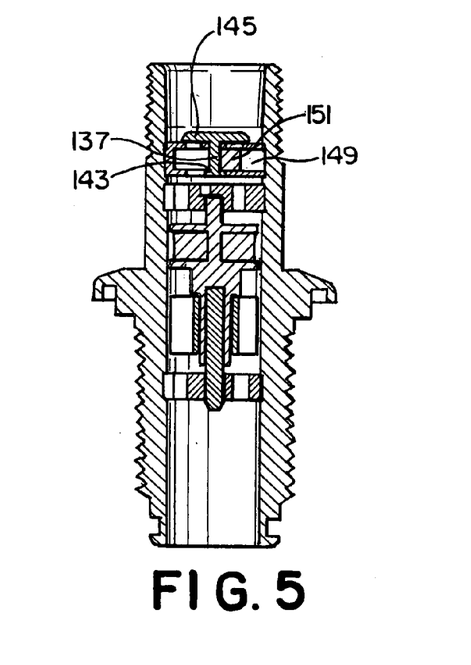
FIG. 5 is a view in cross-section showing the shut-off stopper of FIG. 4 in an engaged condition blocking fluid or restricting the flow of fluid through the outlet port of the pressure vessel of the inventive apparatus.

Turning now to FIGS. 4 and 5, there is shown another alternative embodiment of the invention. In this embodiment of the invention, the fluid flow rate and volume sensor 51 includes a shut-off stopper 131 that is responsive to the sensor device 55 for restricting or stopping flow of fluid through the pressure vessel 13 when it is time to replace the pressure gradient member 43 for filtering and/or conditioning and/or purifying fluid passing therethrough. A stopper holder 133 is mounted in the outlet channel 39 of the outlet port 37 of the pressure vessel 13, and the stopper holder 133 has fluid openings 135 formed therein for permitting fluid to pass therethrough.

The shut-off stopper 131 has a shaft 137 having a first end portion 139 and a second end portion 141, a lip 143 formed on the first end portion 139 of the shaft 137, and a plate 145 formed on the second end portion 141 of the shaft 137.

A central shaft opening 147 is formed in the stopper holder 133 for slideably receiving the shaft 137 of the shut-off stopper 131, and the shaft opening 147 is sized such that the lip 143 and the plate 145 retain the shaft 137 in the shaft opening 147.

The stopper holder 133 has a chamber 149 for holding a magnet 151 that is slideable within the chamber and sized to rest on the lip 143 to prevent the shut-off stopper 131 from rising, thereby holding the plate 145 in engagement with the stopper holder 133 blocking the fluid openings 135 in the stopper holder 133, when it is time to replace the pressure gradient member 43 for filtering and/or conditioning and/or purifying fluid passing therethrough.

An actuator 153, preferably a solenoid device, is mounted in housing 95 and is aligned with the magnet 151, and in response to a signal from the computer 97, causes the magnet 151 to move in the chamber 149 to position the magnet 151 in a blocking position on the lip 143 of the shut-off stopper 131 which prevents the shut-off stopper 131 from rising and holds the plate 145 in engagement with the stopper holder 133 to block the fluid openings 135 in the stopper holder 133 when it is time to replace the pressure gradient member 43 for filtering and/or conditioning and/or purifying fluid passing therethrough, or into a non-blocking position away from the lip 143 which permits the shut-off stopper 131 to rise to position the plate 145 away from engagement with the stopper holder 131 and permit normal operating conditions to occur.

Figure 6:
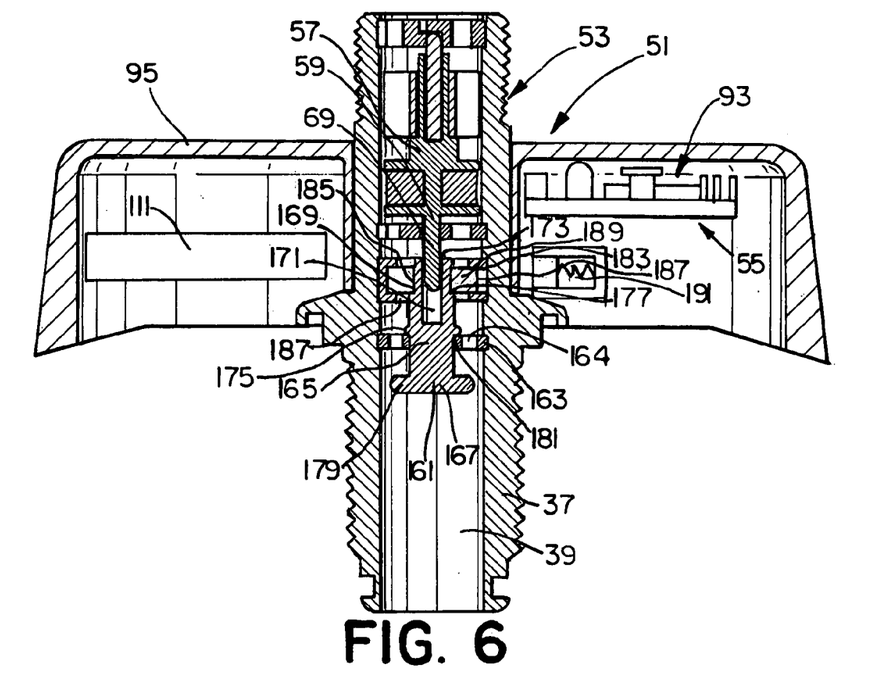
FIG. 6 is a partial view in cross-section of another alternative embodiment of the invention, in which the fluid flow fate and volume sensor of the invention includes a shut-off stopper for restricting or stopping flow of fluid through the inventive apparatus when it is time to replace a filtration cartridge or the like, the shut-off stopper being shown in an unengaged condition.
Figure 7:
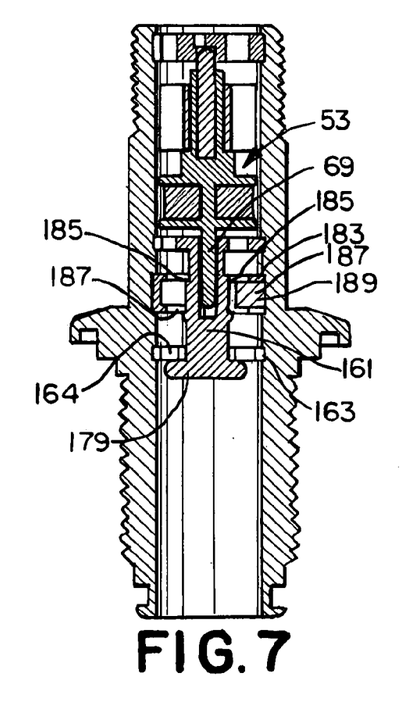
FIG. 7 is a view in cross-section showing the shut-off stopper of FIG. 6 in an engaged condition blocking fluid or restricting the flow of fluid through the outlet port of the pressure vessel of the inventive apparatus.

Turning now to FIGS. 6 and 7, there is shown another alternative embodiment of the invention. In this embodiment of the invention, the fluid flow rate and volume sensor 51 includes a shut-off stopper 161 that as responsive to the sensor device 55 for restricting or stopping flow of fluid through the pressure vessel 13 when it is time to replace the pressure gradient member 43 for filtering and/or conditioning and/or purifying fluid passing therethrough.

A stopper holder 163 is mounted in the outlet channel 39 of the outlet port 37 of the pressure vessel 13, and the stopper holder 163 has fluid openings 164 formed therein for permitting fluid to pass therethrough.

The shut-off stopper 161 has a stopper shaft 165 having a first end portion 167 and a second end portion 169, a stopper bore 171 formed in the stopper shaft 165 and having an opening 173 at the second end portion 169 of the stopper shaft 165 for slideably receiving the second shaft 69 formed in the first end portion 59 of the body 57 of the impeller device 53, an annular ridge 175 formed on the stopper shaft 165, an annular shoulder 177 formed on the stopper shaft 165, and a plate 179 formed on the first end portion 167 of the stopper shaft 165.

The stopper holder 163 has a shaft opening 181 for slideably receiving the stopper shaft 165, and the stopper shaft opening 181 is sized such that the annular ridge 175 and the plate 179 retain the shaft 165 in the shaft opening 181.

A magnet holder 183 is mounted in the outlet channel 39 of the outlet port 37 of the pressure vessel 13 and has a shaft opening 185 for slideably receiving the stopper shaft 165. The magnet holder 183 has fluid openings 187 for permitting fluids to pass therethrough.

The magnet holder 183 also has a chamber 187 for holding a magnet 189 which is slideable within the chamber 187 and sized to abut the shoulder 177 formed on the stopper shaft 165 to prevent the stopper shaft 165 from rising during normal operational fluid flow conditions, thereby spacing the plate 179 away from the stopper holder 163 to keep the fluid openings 164 in the stopper holder 163 unblocked, and to slide out of engagement with the shoulder 177 formed on the stopper shaft 165 to permit the shut-off stopper 161 to slide upwardly on the second shaft 69 formed on the first end portion 59 of the body 57 of the impeller device 53 during low flow/no flow conditions, thereby permitting the plate 179 to block the fluid openings 164 in the stopper holder 163.

An actuator 191, preferably a solenoid device, is mounted in the housing 95 and aligned with the magnet 189, and in response to a signal from the computer 97, causes the magnet 189 to move in the chamber 187 in the magnet holder 183 to position the magnet 189 in a blocking position abutting the shoulder 177 of the stopper shaft 165 to block the stopper shaft 165 from rising during normal operational fluid flow conditions or to position the magnet 189 in a non-blocking position off of the shoulder 177 on the stopper shaft 165 to permit the shut-off stopper 161 to slide upwardly on the second shaft 69 formed on the first end portion 59 of the impeller device 53 during low flow/no flow conditions.

In this embodiment of the invention, the impeller device 53 is inverted.

Our invention includes a fluid flow rate and volume sensor for determining the rate and volume of fluid flowing through an apparatus, such as an apparatus for filtering and/or conditioning and/or purifying a fluid, such as water, and for indicating when a predetermined amount of fluid has flowed through the apparatus to, for example, signal when a cartridge filter housed in an apparatus for filtering and/or conditioning and/or purifying a fluid should be replaced, and an apparatus for filtering and/or conditioning and/or paring a fluid having such a fluid flow area and volume sensor. Our invention has been illustrated above and in the drawings using the exemplary embodiment of an apparatus for filtering and/or conditioning and/or purifying a fluid. However, it will be appreciated by those skilled in the art that changes could be made to the embodiment described above without departing from the broad inventive concept thereof. It is understood, therefore, that this invention is not limited to the particular embodiment disclosed, but it is intended to cover modifications within the spirit and scope of the present invention as defined by the appended claims.

Advantageously, our invention indicates when a cartridge filter 43 or the like housed inside the apparatus 11 should be replaced by indicating when a predetermined amount of fluid that the cartridge filter 43 or the like has been designed to filter and/or condition and/or purify has passed through the cartridge filter 43 or the like, avoiding the problem found in known water filtration apparatuses of replacing a cartridge filter prematurely or worse replacing the cartridge filter well past the recommended life of the cartridge filter.

The invention claimed is:

1. An apparatus for filtering and/or conditioning and/or purifying a fluid, comprising a pressure vessel, an inlet port formed in the pressure vessel for introducing fluid to the pressure vessel, an outlet port formed in the pressure vessel for discharging fluid from the pressure vessel, a chamber formed in the pressure vessel between the inlet and outlet ports for holding a pressure gradient member for filtering and/or conditioning and/or purifying fluid passing therethrough, a fluid flow rate and volume sensor, the fluid flow rate and volume sensor including an impeller device mounted inside the pressure vessel for rotating in response to and at a rate in proportion to fluid flowing through the pressure vessel and past the impeller device, and a sensor device positioned outside the pressure vessel responsive to the impeller device for determining rate and volume of fluid flowing through the pressure vessel and for indicating when the pressure gradient member is to be replaced based upon a determination by the sensor device that a predetermined volume of fluid has flowed through the pressure vessel, the impeller device having vanes that cause the impeller device to rotate at a rate proportionate to fluid flow past the impeller device, the impeller device including a first magnet, the first magnet being mounted on the impeller device for rotation with the impeller device, the first magnet having a magnetic flux, the sensor device including an electrical circuit mounted outside the pressure vessel, the electrical circuit responding to engagement with the magnetic flux of the magnet as the magnet rotates on the impeller device, and a computer responsive to a signal from the electrical circuit for calculating rate and volume of fluid flowing through the apparatus and for sending a signal indicating when the pressure gradient member should be replaced, the impeller device including a body having a first end portion, a second end portion, and a central longitudinal axis extending between the first end portion and the second end portion, a first bore formed in the body extending along the central longitudinal axis and having an open end at the second end portion of the body, a first shaft fixedly mounted within the first bore and having a first end portion extending from the open end at the second end portion of the body in line with the central longitudinal axis of the body, a second shaft formed on the first end portion of the body and extending outwardly away from the body along the central longitudinal axis, a first mounting member mounted in the pressure vessel, the first mounting member having a central bore for receiving the first shaft, the first mounting member having openings therein for permitting fluid to pass therethrough, a second mounting member mounted in the pressure vessel, the second mounting member having a central bore for receiving the second shaft, the second mounting member having openings therein for permitting fluid to pass therethrough, a shut-off stopper responsive to the sensor device for restricting or stopping flow of fluid through the pressure vessel when it is time to replace the pressure gradient member for filtering and/or conditioning and/or purifying fluid passing therethrough, the shut-off stopper being mounted on the first end portion of the first shaft extending from the open end of the first bore formed in the body of the impeller device and having portions that are aligned with the openings in the first mounting member such that when the shut-off stopper engages the first mounting member the openings in the first mounting member are at least substantially blocked to restrict or block flow of fluid through the openings in the first mounting member, the first shaft being slideably keyed in the first bore formed in the body of the impeller device, the first shaft having a second end portion, the first magnet being positioned in a second bore formed in the body of the impeller device and slideable therein; the second bore intersecting the first bore, and an actuator responsive to the computer for causing the first magnet to move in the second bore to a desired location, wherein the first magnet during normal operational fluid flow conditions is positioned by the actuator where the first bore and the second bore intersect to block movement of the shut-off stopper toward the first mounting member by blocking movement of the first shaft inwardly into the first bore of the body of the impeller device, and wherein the first magnet is positioned in the second bore by the actuator away from the first bore in response to a signal from the computer when it is time to replace the pressure gradient member for filtering and/or conditioning and/or purifying fluid passing therethrough to permit the first shaft having the shut-off stopper mounted thereon to move inwardly into the first bore of the body of the impeller device until the shut-off stopper engages the first mounting member to restrict or block flow of fluid through the openings in the first mounting member.

2. An apparatus for filtering and/or conditioning and/or purifying a fluid, comprising a pressure vessel, an inlet port formed in the pressure vessel for introducing fluid to the pressure vessel, an outlet port formed in the pressure vessel for discharging fluid from the pressure vessel, a chamber formed in the pressure vessel between the inlet and outlet ports for holding a pressure gradient member for filtering and/or conditioning and/or purifying fluid passing therethrough, a fluid flow rate and volume sensor, the fluid flow rate and volume sensor including an impeller device mounted inside the pressure vessel for rotating in response to and at a rate in proportion to fluid flowing through the pressure vessel and past the impeller device, and a sensor device positioned outside the pressure vessel responsive to the impeller device for determining rate and volume of fluid flowing through the pressure vessel and for indicating when the pressure gradient member is to be replaced based upon a determination by the sensor device that a predetermined volume of fluid has flowed through the pressure vessel, the impeller device having vanes that cause the impeller device to rotate at a rate proportionate to fluid flow past the impeller device, the impeller device including a first magnet, the first magnet being mounted on the impeller device for rotation with the impeller device, the first magnet having a magnetic flux, the sensor device including an electrical circuit mounted outside the pressure vessel, the electrical circuit responding to engagement with the magnetic flux of the magnet as the magnet rotates on the impeller device, and a computer responsive to a signal from the electrical circuit for calculating rate and volume of fluid flowing through the apparatus and for sending a signal indicating when the pressure gradient member should be replaced, the impeller device including a body having a first end portion, a second end portion, and a central longitudinal axis extending between the first end portion and the second end portion, a first bore formed in the body extending along the central longitudinal axis and having an open end at the second end portion of the body, a first shaft fixedly mounted within the first bore and having a first end portion extending from the open end at the second end portion of the body in line with the central longitudinal axis of the body, a second shaft formed on the first end portion of the body and extending outwardly away from the body along the central longitudinal axis, a first mounting member mounted in the pressure vessel, the first mounting member having a central bore for receiving the first shaft, the first mounting member having openings therein for permitting fluid to pass therethrough, a second mounting member mounted in the pressure vessel, the second mounting member having a central bore for receiving the second shaft, the second mounting member having openings therein for permitting fluid to pass therethrough, a shut-off stopper responsive to the sensor device for restricting or stopping flow of fluid through the pressure vessel when it is time to replace the pressure gradient member for filtering and/or conditioning and/or purifying fluid passing therethrough, a stopper holder mounted in the pressure vessel for holding the shut-off stopper, the stopper holder having fluid openings therein for permitting fluid to pass therethrough, the shut-off stopper having a shaft having a first end portion and a second end portion, a lip formed on the first end portion of the shaft, and a plate formed on the second end portion of the shaft, the stopper holder having a shaft opening for slideably receiving the shaft of the shut-off stopper, the shaft opening being sized such that the lip and the plate retain the shaft in the shaft opening, a second magnet, the stopper holder having a chamber for holding the second magnet, the second magnet being slideable within the chamber of the stopper holder and sized to rest on the lip to prevent the shut-off stopper from rising, thereby holding the plate in engagement with the stopper holder blocking the fluid openings in the stopper holder, when it is time to replace the pressure gradient member for filtering and/or conditioning and/or purifying fluid passing therethrough, and an actuator responsive to the computer for causing the second magnet to move in the chamber to position the second magnet in a blocking position on the lip of the shut-off stopper which prevents the shut-off stopper from rising and holds the plate in engagement with the stopper holder to block the fluid openings in the stopper holder when it is time to replace the pressure gradient member for filtering and/or conditioning and/or purifying fluid passing therethrough or into a non-blocking position away from the lip which permits the shut-off stopper to rise to position the plate away from engagement with the stopper holder under normal operating conditions.

3. An apparatus for filtering and/or conditioning and/or purifying a fluid, comprising a pressure vessel, an inlet port formed in the pressure vessel for introducing fluid to the pressure vessel, an outlet port formed in the pressure vessel for discharging fluid from the pressure vessel, a chamber formed in the pressure vessel between the inlet and outlet ports for holding a pressure gradient member for filtering and/or conditioning and/or purifying fluid passing therethrough, a fluid flow rate and volume sensor, the fluid flow rate and volume sensor including an impeller device mounted inside the pressure vessel for rotating in response to and at a rate in proportion to fluid flowing through the pressure vessel and past the impeller device, and a sensor device positioned outside the pressure vessel responsive to the impeller device for determining rate and volume of fluid flowing through the pressure vessel and for indicating when the pressure gradient member is to be replaced based upon a determination by the sensor device that a predetermined volume of fluid has flowed through the pressure vessel, the impeller device having vanes that cause the impeller device to rotate at a rate proportionate to fluid flow past the impeller device, the impeller device including a first magnet, the first magnet being mounted on the impeller device for rotation with the impeller device, the first magnet having a magnetic flux, the sensor device including an electrical circuit mounted outside the pressure vessel, the electrical circuit responding to engagement with the magnetic flux of the magnet as the magnet rotates on the impeller device, and a computer responsive to a signal from the electrical circuit for calculating rate and volume of fluid flowing through the apparatus and for sending a signal indicating when the pressure gradient member should be replaced, the impeller device including a body having a first end portion, a second end portion, and a central longitudinal axis extending between the first end portion and the second end portion, a first bore formed in the body extending along the central longitudinal axis and having an open end at the second end portion of the body, a first shaft fixedly mounted within the first bore and having a first end portion extending from the open end at the second end portion of the body in line with the central longitudinal axis of the body, a second shaft formed on the first end portion of the body and extending outwardly away from the body along the central longitudinal axis, a first mounting member mounted in the pressure vessel, the first mounting member having a central bore for receiving the first shaft, the first mounting member having openings therein for permitting fluid to pass therethrough, a second mounting member mounted in the pressure vessel, the second mounting member having a central bore for receiving the second shaft, the second mounting member having openings therein for permitting fluid to pass therethrough, a shut-off stopper for restricting or stopping flow of fluid through the pressure vessel when it is time to replace the pressure gradient member for filtering and/or conditioning and/or purifying fluid passing therethrough, a stopper holder mounted in the pressure vessel for holding the shut-off stopper, the stopper holder having fluid openings therein for permitting fluid to pass therethrough, the shut-off stopper having a stopper shaft having a first end portion and a second end portion, a stopper bore formed in the stopper shaft and having an opening at the second end portion of the stopper shaft for slideably receiving the second shaft formed in the first end portion of the body of the impeller device, an annular ridge formed on the stopper shaft, an annular shoulder formed on the stopper shaft, and a plate formed on the first end portion of the stopper shaft, the stopper holder having a shaft opening for slideably receiving the stopper shaft, the stopper shaft opening being sized such that the annular ridge and the plate retain the shaft in the shaft opening, a second magnet, a magnet holder mounted in the apparatus, the magnet holder having a shaft opening for slideably receiving the stopper shaft, the magnet holder having fluid openings therein for permitting fluids to pass therethrough, the magnet holder having a chamber for holding the second magnet, the second magnet being slideable within the chamber of the magnet holder and sized to abut the shoulder formed on the stopper shaft to prevent the stopper shaft from rising during normal operational fluid flow conditions, thereby spacing the plate away from the stopper holder to keep the fluid openings in the stopper holder unblocked, and to slide out of engagement with the shoulder formed on the stopper shaft to permit the shut-off stopper to slide upwardly on the second shaft formed on the first end portion of the body of the impeller device during low flow/no flow conditions, thereby permitting the plate to block the fluid openings in the stopper holder, and an actuator responsive to the computer for causing the second magnet to move in the chamber of the magnet holder to position the second magnet in a blocking position abutting the shoulder of the stopper shaft to block the stopper shaft from rising during normal operational fluid flow conditions or in a non-blocking position off of the shoulder of the stopper shaft to permit the shut-off stopper to slide upwardly on the second shaft formed on the first end portion of the impeller device during low flow/no flow conditions.

4. A fluid flow rate and volume sensor, comprising:

an impeller device for rotating in response to and at a rate proportionate to fluid flowing past the impeller device, a sensor device responsive to the impeller device for determining flow rate and volume of fluid flowing past the impeller device and for indicating when a predetermined volume of fluid has flowed past the impeller device, the impeller device including a body having a first end portion, a second end portion, and a central longitudinal axis extending between the first end portion and the second end portion, a first bore formed in the body extending along the central longitudinal axis and having an open end at the second end portion of the body, a first shaft fixedly mounted within the first bore and having a first end portion extending from the open end at the second end portion of the body in line with the central longitudinal axis of the body, a second shaft formed on the first end portion of the body and extending outwardly away from the body along the central longitudinal axis, a first mounting member, the first mounting member having a central bore for receiving the first shaft, the first mounting member having openings therein for permitting fluid to pass therethrough, a second mounting member, the second mounting member having a central bore for receiving the second shaft, the second mounting member having openings therein for permitting fluid to pass therethrough, a shut-off stopper responsive to the sensor device for restricting or stopping flow of fluid past the impeller device when a predetermined volume of fluid has flowed past the impeller device, the shut-off stopper being mounted on the first end portion of the first shaft extending from the open end of the first bore formed in the body of the impeller device and having portions that are aligned with the openings in the first mounting member such that when the shut-off stopper engages the first mounting member the openings in the first mounting member are at least substantially blocked to restrict or block flow of fluid through the openings in the first mounting member, the first shaft being slideably keyed in the first bore formed in the body of the impeller device, the first shaft having a second end portion, the first magnet being positioned in a second bore formed in the body of the impeller device and slideable therein, the second bore intersecting the first bore, and an actuator responsive to the computer for causing the first magnet to move in the second bore to a desired location, wherein the first magnet during normal operational fluid flow conditions is positioned by the actuator where the first bore and the second bore intersect to block movement of the shut-off stopper toward the first mounting member by blocking movement of the first shaft inwardly into the first bore of the body of the impeller device, and wherein the first magnet is positioned in the second bore by the actuator away from the first bore in response to a signal from the computer when a predetermined volume of fluid has flowed past the impeller device to permit the first shaft having the shut-off stopper mounted thereon to move inwardly into the first bore of the body of the impeller device until the shut-off stopper engages the first mounting member to restrict or block flow of fluid through the openings in the first mounting member.

5. A fluid flow rate and volume sensor, comprising:

an impeller device for rotating in response to and at a rate proportionate to fluid flowing past the impeller device, a sensor device responsive to the impeller device for determining flow rate and volume of fluid flowing past the impeller device and for indicating when a predetermined volume of fluid has flowed past the impeller device, the impeller device including a body having a first end portion, a second end portion, and a central longitudinal axis extending between the first end portion and the second end portion, a first bore formed in the body extending along the central longitudinal axis and having an open end at the second end portion of the body, a first shaft fixedly mounted within the first bore and having a first end portion extending from the open end at the second end portion of the body in line with the central longitudinal axis of the body, a second shaft formed on the first end portion of the body and extending outwardly away from the body along the central longitudinal axis, a first mounting member, the first mounting member having a central bore for receiving the first shaft, the first mounting member having openings therein for permitting fluid to pass therethrough, a second mounting member, the second mounting member having a central bore for receiving the second shaft, the second mounting member having openings therein for permitting fluid to pass therethrough, a shut-off stopper responsive to the sensor device for restricting or stopping flow of fluid past the impeller device when a predetermined volume of fluid has flowed past the impeller device, a stopper holder for holding the shut-off stopper, the stopper holder having fluid openings therein for permitting fluid to pass therethrough, the shut-off stopper having a shaft having a first end portion and a second end portion, a lip formed on the first end portion of the shaft, and a plate formed on the second end portion of the shaft, the stopper holder having a shaft opening for slideably receiving the shaft of the shut-off stopper, the shaft opening being sized such that the lip and the plate retain the shaft in the shaft opening, a second magnet, the stopper holder having a chamber for holding the second magnet, the second magnet being slideable within the chamber of the stopper holder and sized to rest on the lip to prevent the shut-off stopper from rising, thereby holding the plate in engagement with the stopper holder blocking the fluid openings in the stopper holder, when a predetermined volume of fluid has flowed past the impeller device, and an actuator responsive to the computer for causing the second magnet to move in the chamber of the stopper holder to position the second magnet in a blocking position on the lip of the shut-off stopper which prevents the shut-off stopper from rising and holds the plate in engagement with the stopper holder to block the fluid openings in the stopper holder when a predetermined volume of fluid has flowed past the impeller device or into a non-blocking position away from the lip which permits the shut-off stopper to rise to position the plate away from engagement with the stopper holder.

6. A fluid flow rate and volume sensor, comprising:

an impeller device for rotating in response to and at a rate proportionate to fluid flowing past the impeller device, a sensor device responsive to the impeller device for determining flow rate and volume of fluid flowing past the impeller device and for indicating when a predetermined volume of fluid has flowed past the impeller device, the impeller device including a body having a first end portion, a second end portion, and a central longitudinal axis extending between the first end portion and the second end portion, a first bore formed in the body extending along the central longitudinal axis and having an open end at the second end portion of the body, a first shaft fixedly mounted within the first bore and having a first end portion extending from the open end at the second end portion of the body in line with the central longitudinal axis of the body, a second shaft formed on the first end portion of the body and extending outwardly away from the body along the central longitudinal axis, a first mounting member, the first mounting member having a central bore for receiving the first shaft, the first mounting member having openings therein for permitting fluid to pass therethrough, a second mounting member, the second mounting member having a central bore for receiving the second shaft, the second mounting member having openings therein for permitting fluid to pass therethrough, a shut-off stopper for restricting or stopping flow of fluid past the impeller device when a predetermined volume of fluid has flowed past the impeller device, a stopper holder for holding the shut-off stopper, the stopper holder having fluid openings therein for permitting fluid to pass therethrough, the shut-off stopper having a stopper shaft having a first end portion and a second end portion, a stopper bore formed in the stopper shaft and having an opening at the second end portion of the stopper shaft for slideably receiving the second shaft formed in the first end portion of the body of the impeller device, an annular ridge formed on the stopper shaft, an annular shoulder formed on the stopper shaft, and a plate formed on the first end portion of the stopper shaft, the stopper holder having a shaft opening for slideably receiving the stopper shaft, the stopper shaft opening being sized such that the annular ridge and the plate retain the shaft in the shaft opening, a second magnet, a magnet holder, the magnet holder having a shaft opening for slideably receiving the stopper shaft, the magnet holder having fluid openings therein for permitting fluids to pass therethrough, the magnet holder having a chamber for holding the second magnet, the second magnet being slideable within the chamber of the magnet holder and sized to abut the shoulder formed on the stopper shaft to prevent the stopper shaft from rising during normal operational fluid flow conditions, thereby spacing the plate away from the stopper holder to keep the fluid openings in the stopper holder unblocked, and to slide out of engagement with the shoulder formed on the stopper shaft to permit the shut-off stopper to slide upwardly on the second shaft formed on the first end portion of the body of the impeller device during low flow/no flow conditions, thereby permitting the plate to block the fluid openings in the stopper holder, and an actuator responsive to the computer for causing the second magnet to move in the chamber of the magnet holder to position the second magnet in a blocking position abutting the shoulder of the stopper shaft to block the stopper shaft from rising during normal operational fluid flow conditions or in a non-blocking position off of the shoulder of the stopper shaft to permit the shut-off stopper to slide upwardly on the second shaft formed on the first end portion of the impeller device during low flow/no flow conditions.

* * * * *